US012111766B2

(12) United States Patent
Roozbeh et al.

(10) Patent No.: US 12,111,766 B2
(45) Date of Patent: Oct. 8, 2024

(54) ENTITIES, SYSTEM AND METHODS PERFORMED THEREIN FOR HANDLING MEMORY OPERATIONS OF AN APPLICATION IN A COMPUTER ENVIRONMENT

(71) Applicant: Telefonaktiebolaget LM Ericsson (publ), Stockholm (SE)

(72) Inventors: Amir Roozbeh, Stockholm (SE); Dejan Kostic, Solna (SE); Gerald Q. Maguire, Jr., Stockholm (SE); Alireza Farshin, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/765,485

(22) PCT Filed: Oct. 2, 2019

(86) PCT No.: PCT/SE2019/050948
§ 371 (c)(1),
(2) Date: Mar. 31, 2022

(87) PCT Pub. No.: WO2021/066687
PCT Pub. Date: Apr. 8, 2021

(65) Prior Publication Data
US 2022/0334973 A1    Oct. 20, 2022

(51) Int. Cl.
*G06F 12/08* (2016.01)
*G06F 12/06* (2006.01)
*G06F 12/0862* (2016.01)

(52) U.S. Cl.
CPC ......... *G06F 12/0862* (2013.01); *G06F 12/06* (2013.01); *G06F 2212/1024* (2013.01); *G06F 2212/602* (2013.01)

(58) Field of Classification Search
CPC ......... G06F 12/0862; G06F 2212/1024; G06F 2212/602; G06F 12/06; G06F 2212/6026; G06F 2212/654
(Continued)

(56) References Cited

U.S. PATENT DOCUMENTS 9,158,705 B2    10/2015  Topp et al.
2009/0158005 A1*  6/2009  Carmichael ......... G06F 12/0862
                                                            711/213
(Continued)

OTHER PUBLICATIONS

International Search Report and Written Opinion for International Patent Application No. PCT/SE2019/050948, mailed Jul. 28, 2020, 11 pages.
(Continued)

*Primary Examiner* — Hua J Song
(74) *Attorney, Agent, or Firm* — Withrow & Terranova, PLLC

(57) ABSTRACT

Embodiments herein relates e.g., to a method performed by a first entity, for handling memory operations of an application in a computer environment, is provided. The first entity obtains position data associated with data of the application being fragmented into a number of positions in a physical memory. The position data indicates one or more positions of the number of positions in the physical memory. The first entity then provides, to a second entity, one or more indications of the one or more positions indicated by the position data for prefetching data from the second entity, using the one or more indications.

21 Claims, 9 Drawing Sheets

(58) Field of Classification Search
USPC .......................................................... 711/137
See application file for complete search history.

(56) References Cited

U.S. PATENT DOCUMENTS

| | | |
|---|---|---|
| 2012/0066455 A1 | 3/2012 | Punyamurtula et al. |
| 2014/0129772 A1* | 5/2014 | Kalamatianos ..... G06F 12/0862 |
| | | 711/119 |
| 2014/0281351 A1 | 9/2014 | Topp et al. |
| 2014/0289475 A1 | 9/2014 | Kokuryo |
| 2016/0055088 A1 | 2/2016 | Zhang et al. |
| 2018/0314526 A1 | 11/2018 | Grocutt et al. |
| 2019/0294548 A1 | 9/2019 | Kraipak et al. |
| 2020/0034049 A1* | 1/2020 | Bhattacharyya ...... G06F 3/0673 |

OTHER PUBLICATIONS

Extended European Search Report for European Patent Application No. 19947869.4, mailed Jun. 12, 2023, 8 pages.

\* cited by examiner

ENTITIES, SYSTEM AND METHODS
PERFORMED THEREIN FOR HANDLING
MEMORY OPERATIONS OF AN
APPLICATION IN A COMPUTER
ENVIRONMENT

This application is a 35 U.S.C. § 371 national phase filing of International Application No. PCT/SE2019/050948, filed Oct. 2, 2019, the disclosure of which is incorporated herein by reference in its entirety.

TECHNICAL FIELD

Embodiments herein relate to entities, a system and methods performed therein. In particular, embodiments herein relate to handling memory operations of an application in a computer environment.

BACKGROUND

To greatly simplify, a computer system comprises processing units, such as central processing units (CPU), connected to a main memory. The CPU fetches different instructions and data from the main memory, which is introducing delay due to high access latency of a slow main memory. Using on-chip caches is one of the prevalent techniques to hide main memory latency by exploiting a temporal and spatial locality of memory accesses to these on-chip caches. The gap between processor and memory speed, also known as memory wall, has been known to be one of the critical barriers for achieving better performance in computer systems. To address this issue, computer architects have first introduced the cache hierarchy in processors to keep the last recently used data in faster memories known as static random access memory (SRAM). SRAM is a form of computer memory that can be read and changed in any order, typically used to store working data and machine code.

As static RAMs (SRAM) are more expensive to fabricate, the size of the cache hierarchy is quite small compared to the main memory, also referred to as dynamic RAM (DRAM), and storage, which cannot fully eliminate the memory wall. Therefore, a technique has been developed called prefetching, which technique fetches, ahead of time, the data that is "expected" to be used later by the processor, to boost an execution time by further hiding the memory latency and reducing CPU waiting time also referred to as stall time.

Prefetching may be realized in both hardware (H/W) and software (S/W). Hardware prefetching may generally be faster than its software equivalent. Current hardware prefetcher techniques in CPUs are mostly based on fetching the adjacent instruction/data and/or the next cache line(s), to the cache hierarchy (e.g., a layer two (L2) and a layer one (L1)), when a cache line is accessed.

There has been considerable research in the field of prefetching, aiming to optimize software and suggest new variants for hardware prefetchers to make the prefetching technique more useful, as well as productive, for all type of applications. Most of these research efforts assume that data is positioned contiguously.

In computer systems, however, there are many scenarios where the contiguous data is, or may become, non-contiguous in the physical memory, thereby resulting in fragmented data in memory. This situation may occur due to several reasons such as: memory allocation at the platform layer, e.g., memory management in operating systems; deliberately scattering data, e.g., to ensure security or to improve effective memory bandwidth; fine-grained memory allocation that takes hardware characteristics into account, e.g., slice-aware memory management; or a combination of any of these reasons.

Consequently, the applications using data that is fragmented may not benefit from the current hardware or software prefetching techniques employed with current prefetchers, which causes performance degradation.

SUMMARY

Data associated with an application may end up physically fragmented in the physical memory, but existing prefetching solutions assume that the memory is contiguous. For instance, if an application, e.g. via a CPU, requests data from address A, hardware prefetchers may prefetch address A+1, i.e. the adjacent address. However, if the next desired chunk of data is available at address A+J, wherein J is not a constant offset and can be different for any given address, current prefetchers cannot prefetch that address, i.e. the address A+J. Thus, the disjointed nature or non-contiguity of data makes current prefetchers ineffective.

An object of embodiments herein is to provide a mechanism that improves prefetching of data in an efficient manner.

The object may be achieved by providing a method performed by a first entity for handling memory operations of an application in a computer environment. The first entity obtains position data associated with data of the application being fragmented into a number of positions in a physical memory. The position data indicates one or more positions of the number of positions in the physical memory. The first entity then provides, to a second entity, one or more indications of the one or more positions indicated by the position data for prefetching data from the second entity, using the one or more indications.

According to another aspect of embodiments herein, the object may be achieved by providing a method performed by a second entity for handling memory operations of an application in a computer environment. The second entity obtains one or more indications of one or more positions indicated by position data, wherein the position data is associated with data of the application being fragmented into a number of positions in a physical memory. The position data indicates one or more positions of the number of positions in the physical memory. Upon execution of the application, the second entity performs prefetching of the data based on the obtained one or more indication of one or more positions.

According to yet another aspect of embodiments herein, the object may be achieved by providing a method performed by a system comprising a first entity, a second entity and a memory entity for handling memory operations of an application in a computer environment. The system obtains, at the first entity from the memory entity, position data associated with data of the application being fragmented into a number of positions in a physical memory. The position data indicates one or more positions of the number of positions in the physical memory. The system then provides, from the first entity to the second entity, one or more indications of the one or more positions indicated by the position data. Upon execution of the application, the system performs prefetching of the data based on the indicated one or more positions.

According to a further aspect of embodiments herein, the object may be achieved by providing a first entity configured to handle memory operations of an application in a computer environment. The first entity is further configured to obtain position data associated with data of the application being fragmented into a number of positions in a physical memory. The position data indicates one or more positions of the number of positions in the physical memory. The first entity is further configured to provide, to a second entity, one or more indications of the one or more positions indicated by the position data for prefetching data from the second entity using the one or more indications.

According to yet another aspect of embodiments herein, the object may be achieved by providing a second entity configured to handle memory operations of an application in a computer environment. The second entity is further configured to obtain one or more indications of one or more positions indicated by position data, wherein the position data is associated with data of the application being fragmented into a number of positions in a physical memory. The position data indicates one or more positions of the number of positions in the physical memory. The second entity is further configured to, upon execution of the application, perform prefetching of the data based on the obtained one or more indication of one or more positions.

According to yet another aspect of embodiments herein, the object may be achieved by providing a system, comprising a first entity, a second entity and a memory entity, configured to handle memory operations of an application in a computer environment. The system is further configured to obtain, at the first entity from the memory entity, position data associated with data of the application being fragmented into a number of positions in a physical memory. The position data indicates one or more positions of the number of positions in the physical memory. The system is further configured to provide, from the first entity to the second entity, one or more indications of the one or more positions indicated by the position data. The system is further configured to, upon execution of the application, perform prefetching of the data based on the indicated one or more positions.

It is furthermore provided herein a computer program comprising instructions, which when executed by a processor, causes the processor to perform actions according to any of the methods herein. A carrier comprising the computer program wherein the carrier may be one of an electronic signal, an optical signal, an electromagnetic signal, a magnetic signal, an electric signal, a radio signal, a microwave signal, or a computer-readable storage medium.

Embodiments herein disclose a technique that overcomes the above mentioned problem by extending operations of the second entity such as a current hardware or software prefetcher to perform prefetching based on indicated position. The embodiments herein exploit the already available information in the system to make current second entities react/prefetch more intelligently. Thus, embodiments herein provide a mechanism that improves prefetching of data in an efficient manner.

BRIEF DESCRIPTION OF THE DRAWINGS

Examples of embodiments herein are described in more detail with reference to the attached drawings in which.

DETAILED DESCRIPTION

Prefetching is a technique used by computer processors to boost execution performance, through hardware, software, or combination of them. Current hardware prefetchers prefetch one or more cache lines into the cache, assuming the data comprised in that or those cache lines will be used in future operations, hence reducing CPU stall time. A cache line is the unit of data transfer between the cache memory and main memory. The size of a cache line depends on CPU generation and architecture. In current generation systems, for example, 64 bytes is a popular cache line size but other cache line sizes, such as 32 and 128 are also used. The CPU may read or write, from or to memory, a single cache line at a time, which may be referred to as byte addressable.

There are different models for prefetching, such as:

Next-Line (or Adjacent-Line) Prefetching, which will prefetch X+1 when line X in memory is requested.

Next-N-Line Prefetching, which will prefetch X+1, X+2, . . . , X+N when line X in memory is requested. Thus N may indicate a plurality of lines.

Stride Prefetching, in which X+S, X+2S, . . . , X+NS will be prefetched when line X in memory is requested. S is a stride for a known pattern and N is the depth of the pattern.

The stride, or stride of an array, may also be referred to as increment, pitch or step size. The stride is the number of locations in memory between beginnings of successive array elements, measured in bytes or in units of the size of the array's elements. The stride cannot be smaller than the element size but it can be larger, indicating extra space between elements. An array with stride of exactly the same size as the size of each of its elements may be said to be contiguous in memory.

There are many factors in computer systems, which affect the positioning of data in a physical memory. Data may, for example, not always be contiguous data but instead be fragmented in a physical memory.

Figure 1:
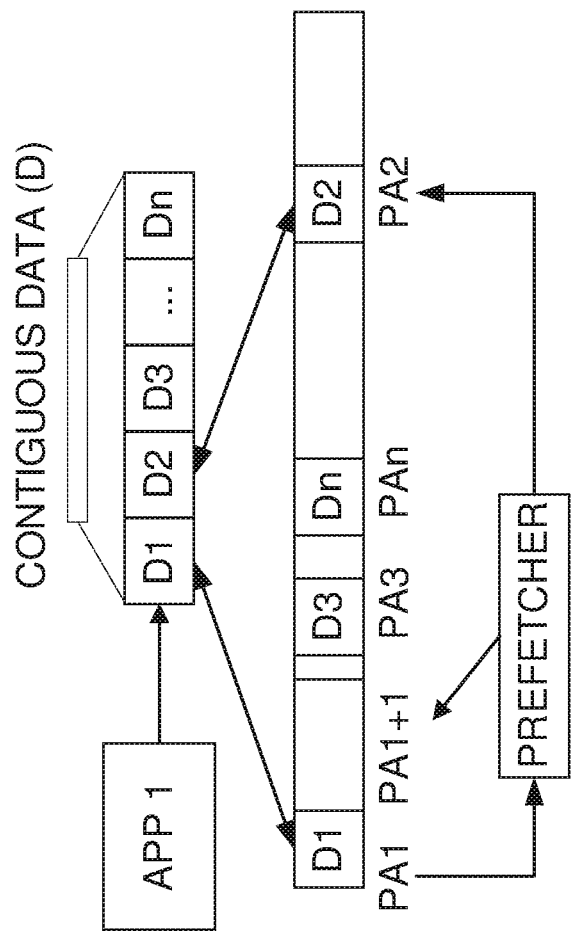
FIG. 1 is a schematic overview illustrating a scenario where a unit of contiguous data (D) is assumed to comprise at least two portions.

As an illustrative example, reference is made to FIG. 1. FIG. 1 depicts a scenario where a unit of contiguous data (D) is assumed to comprise at least two portions: a first portion D1 and a second portion D2. Each of the portions D1 and D2 may be associated with physical addresses PA1 and PA2, respectively. The main objective of the prefetcher in FIG. 1 is to prefetch D2 whenever D1 is accessed. However, prefetching D2 based on D1 may not be very straightforward in a scenario where PA1, i.e. the physical address for D1, and PA2, i.e. the physical address for D2, are not physically adjacent, due to data fragmentation. FIG. 1 illustrates how contiguous data may be fragmented in DRAM, e.g. D1 and D2 are not located adjacent to each other. I.e. the next data portion is not in adjacent location PA1+1.

As discussed above, data fragmentation may happen for different reasons, some of which are as follows:

Memory allocation phase: The operating system's Memory Management Unit (MMU), e.g., buddy allocator and slab allocator, together with low-level hardware memory optimizers, e.g., slice-aware memory management, and/or scatter engine may allocate non-contiguous physical memory when an application requests for a certain amount of memory.

Data positioning phase: Some techniques, e.g., data scattering, vectorized input/output (I/O), may position data in different physical locations for different reasons such as enhanced memory bandwidth and/or security reasons. The positioning of data might be independent or dependent to memory allocation, e.g., slice-aware memory management.

Figure 2:
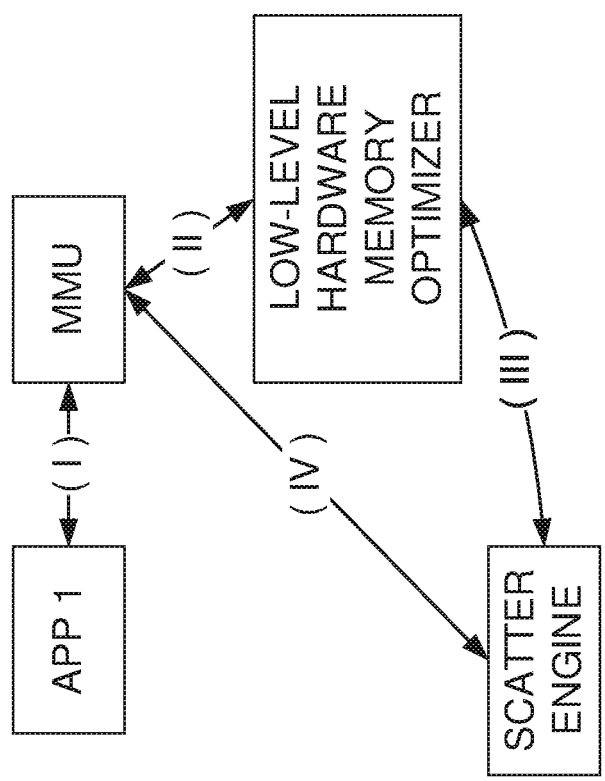
FIG. 2 is a schematic diagram illustrating a scenario where memory allocation may result in fragmentation of data.

FIG. 2 depicts a scenario where memory allocation may result in fragmentation of data. Signs (II), (III), and (IV) in FIG. 2 are showing the memory allocation that may result in fragmented portions of DRAM for a given memory request from an application (I). The MMU may e.g. in cooperation with a low-level hardware memory optimizer fragment memory (II). The low-level hardware memory optimizer may with the scatter engine fragment memory and position data at these positions. The signs (III) and (IV) are showing data positioning, which may result in fragmentation of data. E.g. data scattering may position data in different physical locations for enhanced memory bandwidth. The MMU allocates positions of memory for fragmented data. The data positioning of the memory may be allocated by the low level hardware memory optimizer and further scattered by using a scatter engine.

Embodiments herein use information in different components of the system to make prefetching more effective for the cases in which the contiguous data is scattered or fragmented in physical memory.

Figure 3:
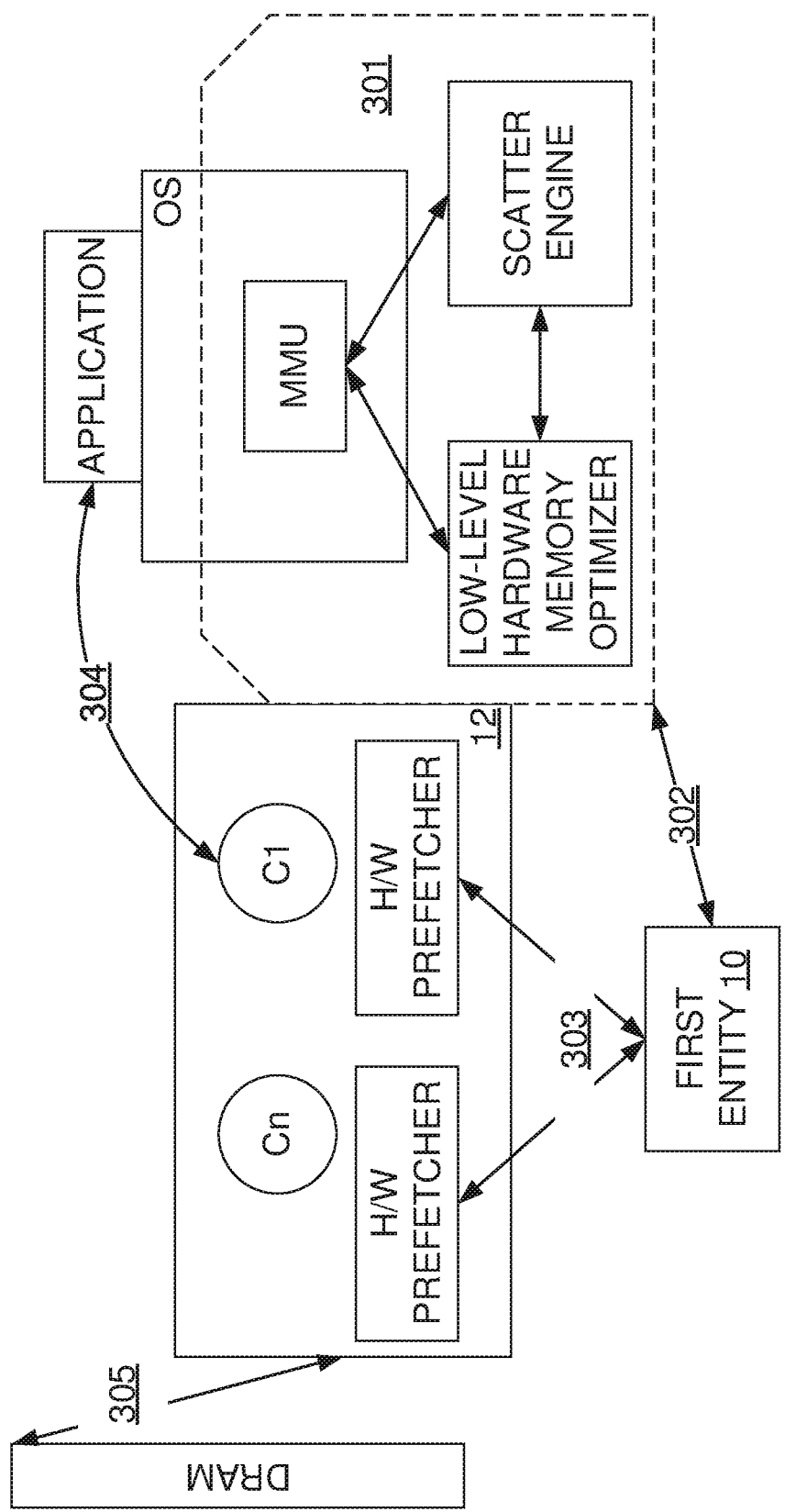
FIG. 3 is a schematic overview depicting embodiments of entities according to embodiments herein.

FIG. 3 shows the structure of some embodiments herein, which are focused on a first entity 10, also referred to as a "Next-chunk finder" entity or Finder. The first entity may be implemented as an extension to a second device 12 such as a prefetcher by introducing new functionality in the second entity, or implemented as a new entity in hardware or software, which may be referred to as a stand-alone solution. A chunk of data, when used herein, may e.g. refer to a fragment of information which is used in multimedia formats, such as PNG, IFF, MP3 and AVI; fragments of information that may be downloaded or managed by P2P programs; and/or a set of data which is sent to a processor or one of the parts of a computer for processing, e.g., a sub-set of rows of a matrix. Each chunk of data may e.g. comprise a header which indicates relevant parameters, such as the type of chunk, comments, and size. Each chunk may also comprise a variable area containing data which are decoded by the program from the parameters in the header.

The entities, system and methods provided herein aim to effectively prefetching data when an application's data is fragmented in a physical memory. The first entity 10 interacts with, and gathers information from, different entities in the system, e.g., the MMU, the low-level hardware memory optimizer such as a slice selection function, and the scatter engine, which may also be referred to as a scatter-gather engine, in order to identify the positioning of the application's data, and the interact/program prefetching module to specify the next address(es) that needs to be prefetched. In this manner, embodiments herein differ from current prefetchers that impulsively prefetch the next physical adjacent data to the CPU cache.

The advantages of the proposed solution include, but are not limited to, making prefetchers useful for scenarios where data associated with an application is fragmented in the physical memory. This is possible by selecting the right chunk of data from the physical memory to be prefetched, contrary to current prefetchers where the next physical adjacent addresses are being prefetched.

Further advantages comprise improving the application response time, since the data will be ready faster for the CPU on which the application is running. Improving the application performance and boosting the execution time, means that more tasks may be executed with fewer resources in a shorter time. Reducing the CPU waiting time for data, also referred to as the CPU stall time, may lead to a more efficient use of CPU and more savings, both in terms of resources and expenses. Furthermore, in a system such as a CPU that does not need to wait for data, power consumption may be reduced. This is since the CPU consumes power without performing any task when it waits for the data.

The first entity 10 may perform two tasks. In one task, the first entity 10 gets information from different entities in the system regarding the way that the memory is allocated and/or the data is positioned in physical memory. In another task, the first entity may use this information in two different ways: the first entity 10 may program the second entity 12 to prefetch the next chunk of fragmented data; and/or the second entity 12 can query the first entity 10 to identify the next chunk(s) to be prefetched.

Different steps for prefetching non-contiguous or disjoint data are disclosed in FIG. 3. FIG. 3 depicts the following actions, which do not necessarily have to be undertaken in the described order.

Action 301. An application requests memory from a memory allocator entity in the system. The memory allocation may be performed in many different ways. E.g. memory allocator entity, e.g., a buddy allocator, allocates memory independently. In another example a memory allocator entity interacts with a low-level hardware memory optimizer entity, e.g., slice selection algorithm, to find a more optimized way of allocating memory. In a further example a memory allocator entity interacts with a scatter engine to gather the requirement of scattering, e.g., chunk size, number of chunks, chunk distance, distribution algorithm, and allocates memory. The memory allocator entity may interact with all entities in the system, which can affect memory allocation. The allocated memory in this action may be fragmented.

Action 302. The first entity 10 may be informed about the way that memory is allocated, e.g. including fragmentation information defining fragmentation of the memory. Additionally, the first entity 10 may be informed about the way data is positioned in the physical memory. The latter information may be useful in cases wherein the allocated memory gets further fragmented in the positioning phase by other entities such as a scatter engine that decides how data is going to be scattered in the allocated memory; and/or a low-level hardware memory optimizer that decides how to position data in the allocated memory after memory allocation or during run-time.

At the end of this action, the first entity 10 knows or is informed about the way the data is positioned in the physical memory and the first entity 10 may use this information to find the next "expected" chunk(s) to be accessed by the application. This information may be summarized as a compressed function, such as a polynomial, or a hash function, or it may be saved as a set of offsets/addresses in a table similar to a translation lookaside buffer (TLB). A TLB is a memory cache that is used to reduce the time taken to access a user/application memory location.

Action 303. The first entity 10 interacts with the second entity 12, such as one or more hardware prefetchers (e.g., the ones in the CPU) or software prefetchers, and the first entity 10 may perform one or more of the following steps: The first entity 10 programs one or multiple hardware prefetchers e.g. the first entity 10 notifies one or multiple hardware prefetchers so that they could query the next prefetchable chunk(s) from the memory.

Action 304. The application starts using its allocated memory and the application requests the first portion of its data, e.g., D1 in FIG. 1 which resides in PA1. The data will be loaded in the CPU core(s) on which the application is running, such as C1 in FIG. 3.

Action 305. The second entity 12, such as the hardware prefetcher(s), prefetches the second portion of the data, e.g., D2 in FIG. 1, which resides in PA2, rather than prefetching data from PA1+1. As mentioned above, the second entity 12 may also query the first entity 10 to find out the next-prefetchable chunk, i.e., PA2 in this example.

It is herein disclosed a system and method for making current hardware prefetchers, i.e. the second entity 12, effective for non-contiguous data, such as scattered and/or fragmented data. The solution exploits the already existing knowledge inside the system to identify the most appropriate candidate(s) e.g. data chunks, for prefetching.

Figure 4:
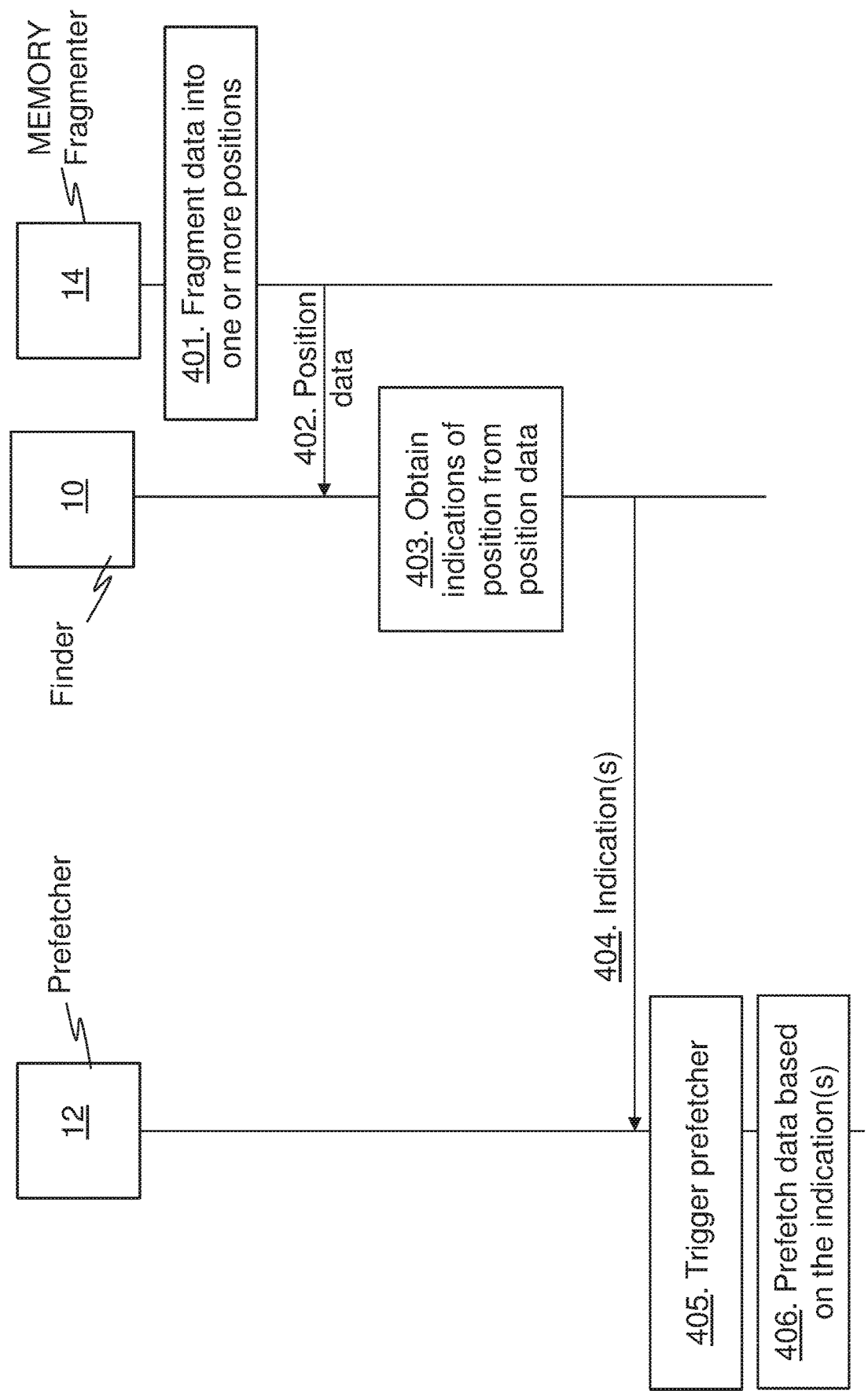
FIG. 4 is a combined flowchart and signaling scheme according to embodiments herein.

FIG. 4 discloses a combined signalling scheme and flowchart disclosing a solution according to embodiments herein.

Action 401. A third entity 14 such as an MMU or similar may fragment data into one or more positions of the physical memory. The third entity 14 may further allocate memory to an application e.g. fragmented data.

Action 402. The third entity 14 may transmit position data indicating positioning of the fragmented data to the first entity 10. The position data may comprise internal data indicating of the positions of the fragmented data and/or how the memory is fragmented.

Action 403. The first entity 10 thus obtains position data associated with data and may further obtain one or more indications of the position data. E.g., the first entity 10 may obtain info from a scatter engine concerning the scattering that is used to e.g. retrieve positions of the physical memory in a table or similar.

Action 404. The first entity 10 transmits the one or more indications to the second entity 12. E.g. a message or internally comprising an index in a table, memory addresses or similar.

Action 405. An application is executed triggering the second entity 12 to prefetch data.

Action 406. The second entity 12 then prefetches data based on the received one or more indications.

The position data may be divided into two-phases either or both of which may result in a disjoint data positioning in physical memory. The third entity may perform a first memory allocation phase, and/or a second data positioning phase.

During the first phase, it is decided which parts of the physical memory will be given to an application. The memory allocated from physical memory address space might be disjoint or continuous from this phase.

The second phase determines memory allocated for data, e.g., due to slab allocation, buddy algorithm, or low-level optimization such as slice aware memory allocation. E.g.

when the memory allocation results in a disjoint physical memory the data is disjointed as well even if the second phase happens contiguously from an application's "Virtual" memory address space, thus the final positioning of the data at the physical memory will be disjoint. If the assigned memory from allocation phase is contiguous, e.g., the system is forced to allocate a contiguous memory, e.g., via huge page, still the data might be positioned disjointly, e.g., due to a scattering policy or slice-aware memory optimization. A memory page may be a fixed-length contiguous block of (virtual) memory, described by a single entry in a page table. The available page sizes depend on system characteristics. The operating system (OS) may select one or more page sizes from the page sizes supported by the architecture. Standard page sizes are 4 KB (on x86 and x86_64) or 16 KB (on IA64). The Huge Pages feature enables the OS to manage large pages of memory in addition to the standard page sizes (e.g., 2 M or 1 gigabyte, etc.). Using huge pages means you will need fewer pages. This decreases the number of mapping tables. By using huge pages, the system has fewer page tables to deal with and hence less overhead to access/maintain them.

Figure 5:
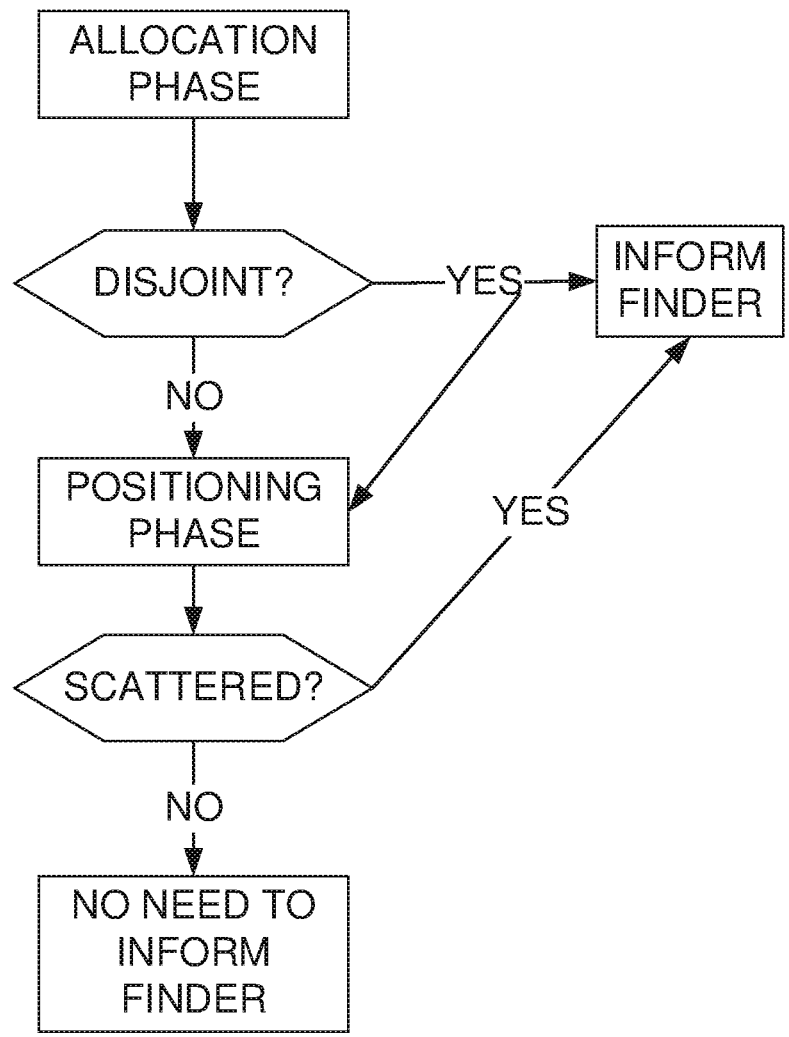
FIG. 5 is a flowchart according to embodiments herein.

Following the second phase, the first entity 10 may need to obtain information of: a first type, when allocated physical memory is disjoint, and that allocated memory is used contiguously; or a second type, when the allocated memory is contagious but positioning decides to scatter data; or both first type and second type, when the allocated memory is disjoint, and also the data is spread among disjoint position or even inside one of the portions. FIG. 5 depicts the phases described.

Figure 6:
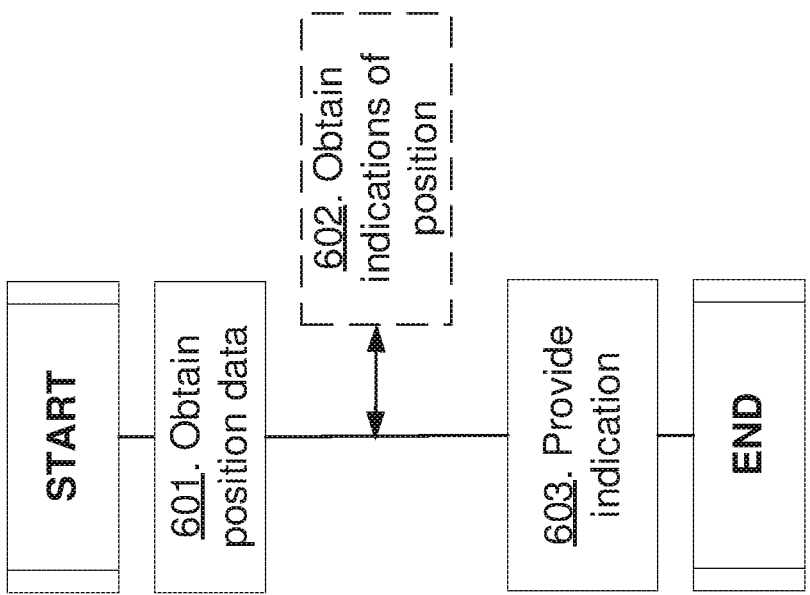
FIG. 6 is a flowchart depicting a method performed by a first entity according to embodiments herein.

Example embodiments of a method performed by the first entity 10 for handling memory operations of an application in a computer environment, will now be described with reference to a flowchart depicted in FIG. 6. The first entity 10 may be represented by a standalone entity, or a collocated entity. The first entity 10 may be at least partly collocated with a prefetcher entity. From an implementation point of view, the first entity may e.g. be realized with two pieces. One piece, e.g. a container for an index table, may be co-located with a prefetcher, and the other piece may communicate with other entities in a system to obtain the fragmentation information.

The method comprises the following actions, which actions may be taken in any suitable order. Actions that are optional are presented in dashed boxes in FIG. 6.

Action 601. The first entity 10 obtains position data associated with data of the application being fragmented into a number of positions in a physical memory, wherein the position data indicates one or more positions of the number of positions in the physical memory. The position data may be obtained by being retrieved from the third entity 14 involved in a final positioning of data. The position data may be one or more of the following: an index; an algorithm; a position value; and one or more intervals of positions of the physical memory. The position value may enable to address the different portions in physical memory (e.g., physical address of each portion in memory). The one or more indications and/or the position data may be obtained dynamically during execution of an application. The obtained position data may be of a first type and/or a second type. The first type may indicate that the physical memory allocated is disjoint and the second type may indicate that the physical memory allocated is contiguous.

Action 602. The first entity 10 may further obtain the one or more indications, of the one or more positions of the number of positions in the physical memory, based on the obtained position data.

Action 603. The first entity 10 provides, to the second entity 12, the one or more indications of the one or more positions indicated by the position data for prefetching data from the second entity using the one or more indications.

Figure 7:
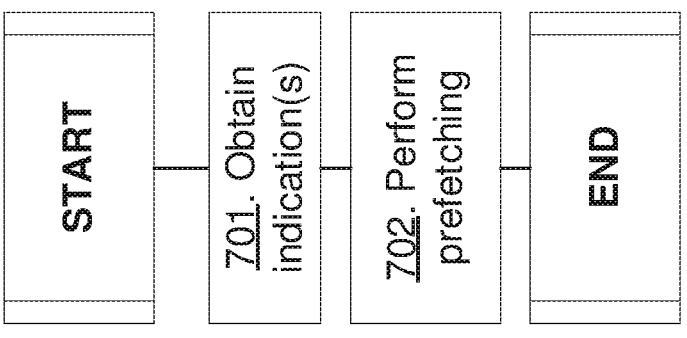
FIG. 7 is a flowchart depicting a method performed by a second entity according to embodiments herein.

Example embodiments of a method performed by the second entity 12 for handling memory operations of the application in the computer environment, will now be described with reference to a flowchart depicted in FIG. 7. The second entity 12 may be represented by a prefetcher entity.

The method comprises the following actions, which actions may be taken in any suitable order.

Action 701. The second entity 12 obtains one or more indications of one or more positions indicated by position data, wherein the position data is associated with data of the application being fragmented into a number of positions in the physical memory. The position data indicates one or more positions of the number of positions in the physical memory. The one or more indications may be obtained dynamically during execution of a service. The position data may be obtained by being received from the first entity 10, or the third entity 14 involved in the final positioning of data. The position data may be one or more of the following: an index; an algorithm; a position value; and one or more intervals of positions of the physical memory. The obtained position data may be of the first type and/or the second type, wherein the first type may indicate that the physical memory allocated is disjoint and the second type may indicate that the physical memory allocated is contiguous.

Action 702. Upon execution of the application, the second entity 12 performs prefetching of the data based on the obtained one or more indication of one or more positions.

Figure 8:
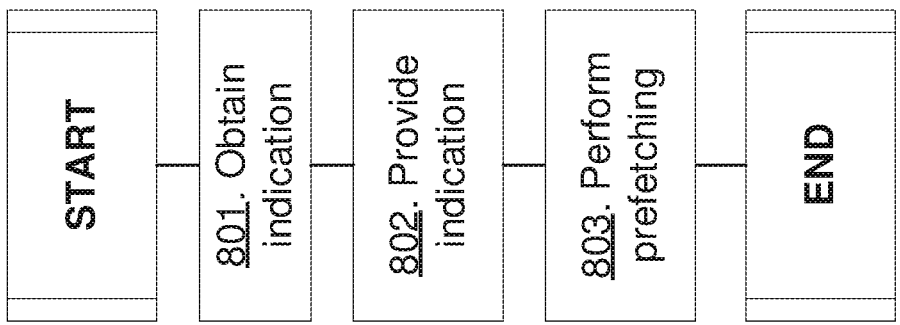
FIG. 8 is a flowchart depicting a method performed by a system according to embodiments herein.

Example embodiments of a method performed by a system comprising the first entity 10, the second entity 12 and the memory entity for handling memory operations of an application in a computer environment, will now be described with reference to a flowchart depicted in FIG. 8.

The method comprises the following actions, which actions may be taken in any suitable order.

Action 801. The system obtains, at the first entity 10 from the memory entity, position data associated with data of the application being fragmented into a number of positions in a physical memory, wherein the position data indicates one or more positions of the number of positions in the physical memory.

This Action relates to Actions 601 and 602 described above.

Action 802. The system further provides, from the first entity 10 to the second entity 12, the one or more indications of the one or more positions indicated by the position data. This Action relates to Action 603 described above.

Action 802. Upon execution of the application, the system further performs prefetching of the data based on the indicated one or more positions. This Action relates to Action 702 described above.

Figure 9:
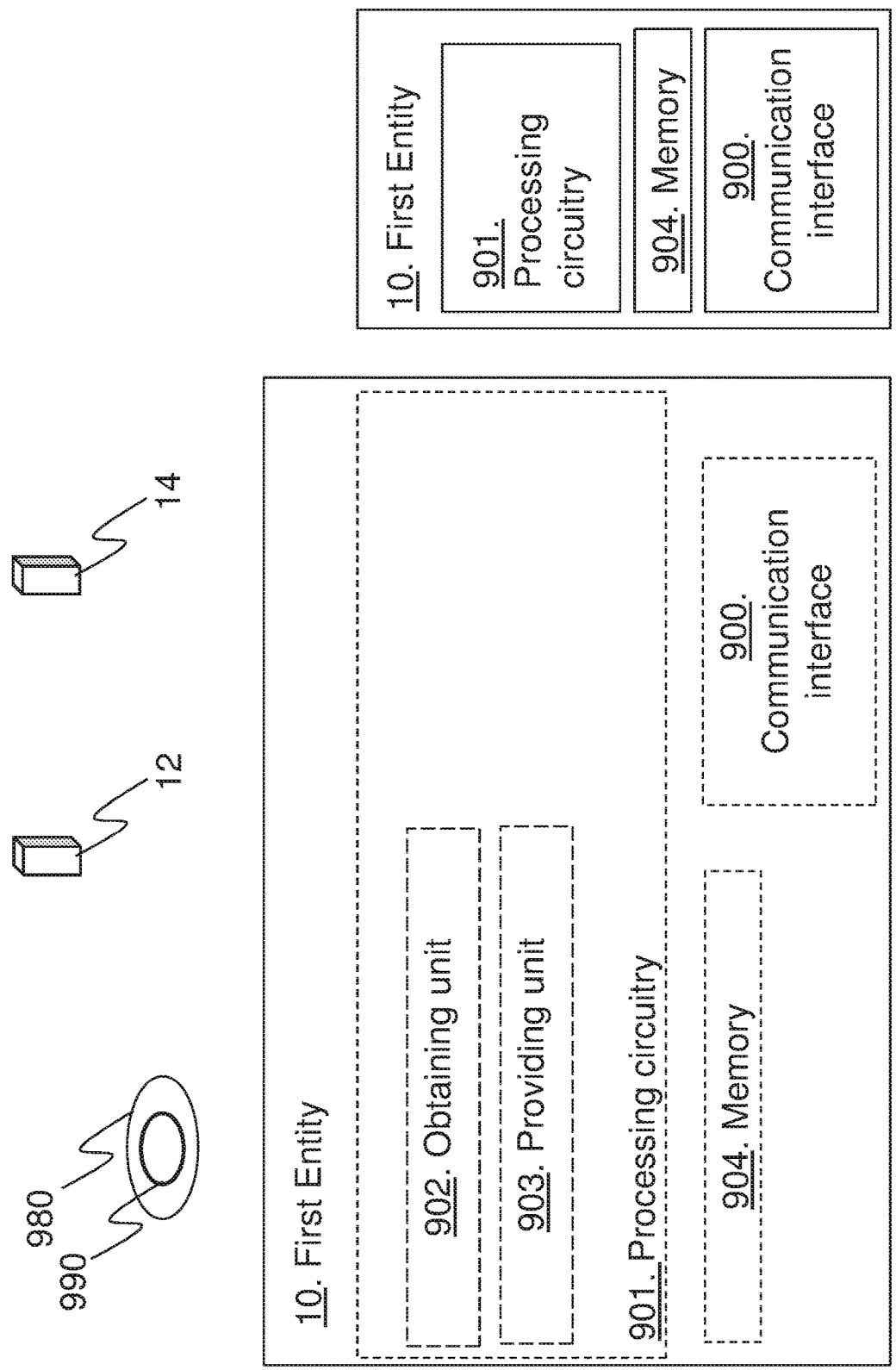
FIG. 9 is a block diagram depicting a first entity according to embodiments herein.

To perform the method actions above for handling memory operations of an application in a computer environment, the first entity 10 may comprise the arrangement depicted in FIG. 9.

FIG. 9 is a block diagram depicting the first entity 10 in two embodiments. The first entity 10 may be used for handling memory operations of an application in a computer environment, e.g. position data either fragmented or at fragmented memory positions. This first entity 10 may comprise a processing circuitry 901 e.g. one or more processors, configured to perform the methods herein.

The first entity 10 may be a standalone entity, or a collocated entity, wherein the first entity 10 may be at least partly collocated with a prefetcher entity.

The first entity 10 may comprise a communication interface 900 depicted in FIG. 9, configured to communicate e.g. with the second entity 12 and the third entity 14. The communication interface 900 may comprise a transceiver, a receiver, a transmitter, and/or one or more antennas.

The first entity 10 may comprise an obtaining unit 902, e.g. a receiver, transceiver or obtaining module. The first entity 10, the processing circuitry 901, and/or the obtaining unit 902 is configured to obtain position data associated with data of the application being fragmented into a number of positions in the physical memory, wherein the position data indicates the one or more positions of the number of positions in the physical memory.

The position data may be obtained by being retrieved from the third entity 14 involved in the final positioning of data. The position data may be one or more of the following: an index; an algorithm; a position value; and one or more intervals of positions of the physical memory. The first entity 10, the processing circuitry 901, and/or the obtaining unit 902 may be further configured to obtain the one or more indications based on the obtained position data. The one or more indications and/or the positioning data may be obtained dynamically during execution of an application. The obtained position data may be of the first type and/or the second type, wherein the first type may indicate that the physical memory allocated is disjoint and the second type may indicate that the physical memory allocated is contiguous.

The first entity 10 may further comprise a providing unit 903, e.g. a transmitter, transceiver or providing module. The first entity 10, the processing circuitry 901, and/or the providing unit 903 may be configured to provide, to the second entity 12, the one or more indications of the one or more positions indicated by the position data for prefetching data from the second entity 12 using the one or more indications.

The first entity 10 further comprises a memory 904. The memory comprises one or more units to be used to store data on, such as indications, position data, and/or applications to perform the methods disclosed herein when being executed, and similar.

The methods according to the embodiments described herein for the first entity may be implemented by means of e.g. a computer program product 980 or a computer program, comprising instructions, i.e., software code portions, which, when executed on at least one processor, cause the at least one processor to carry out the actions described herein, as performed by the first entity 10. The computer program 980 may be stored on a computer-readable storage medium 990, e.g. a universal serial bus (USB) stick, disc or similar. The computer-readable storage medium 990, having stored thereon the computer program product, may comprise the instructions which, when executed on at least one processor, cause the at least one processor to carry out the actions described herein, as performed by the first entity 10. In some embodiments, the computer-readable storage medium may be a non-transitory computer-readable storage medium.

Figure 10:
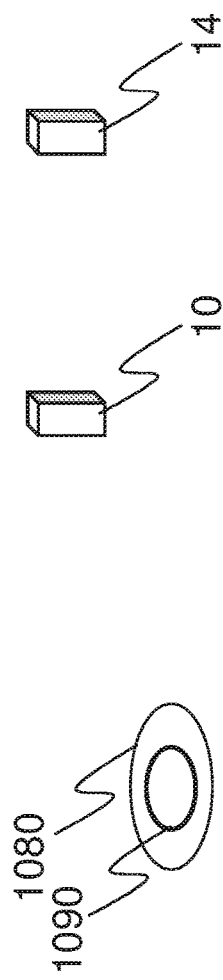
FIG. 10 is a block diagram depicting a second entity according to embodiments herein.
Figure 10:
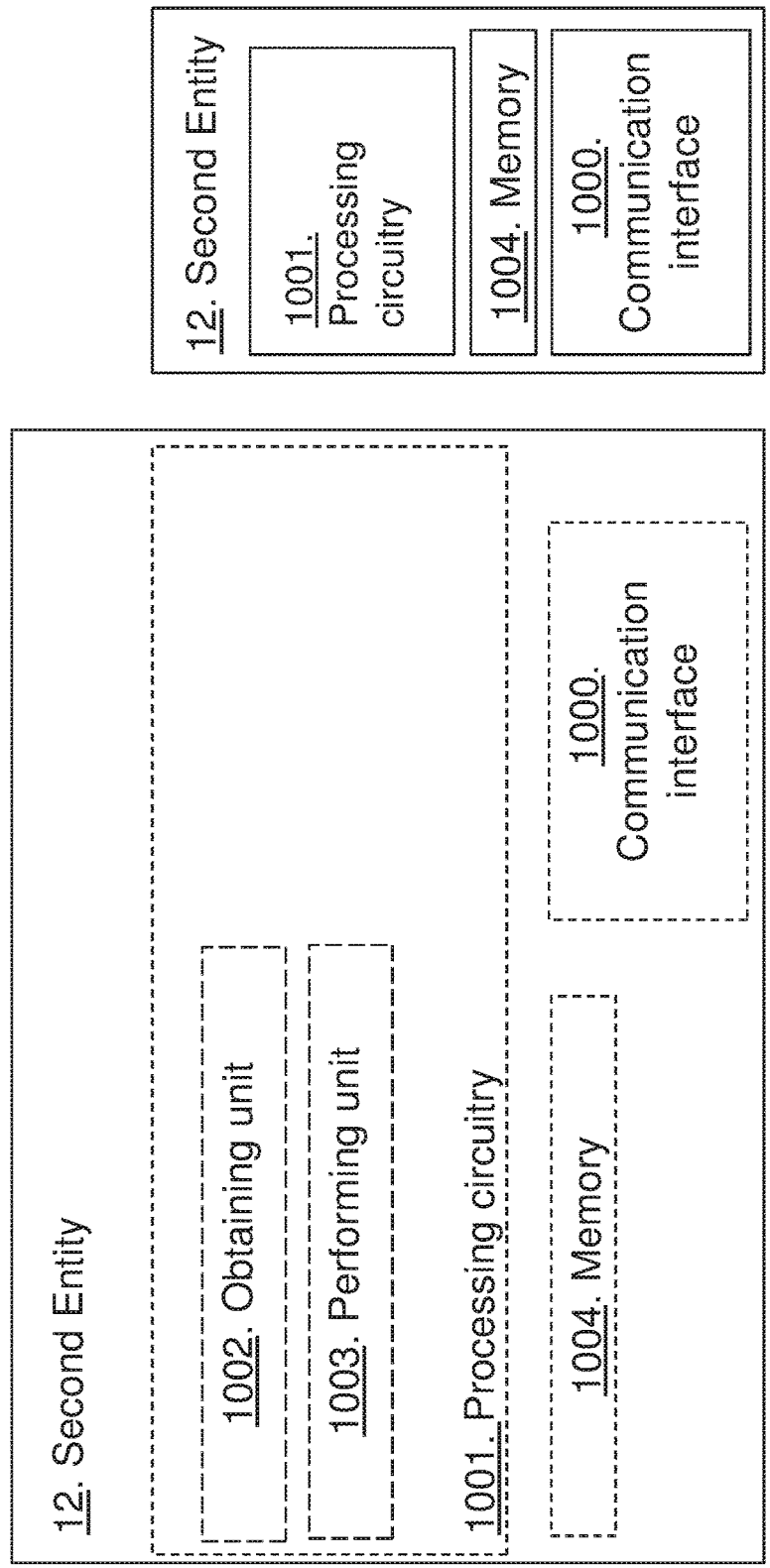

To perform the method actions above for handling memory operations of an application in a computer environment, the second entity 12 may comprise the arrangement depicted in FIG. 10.

FIG. 10 is a block diagram depicting the second entity 12 in two embodiments. The second entity 12 may be used for handling memory operations of an application in a computer environment, e.g. obtaining etc. This second entity 12 may comprise a processing circuitry 1001 e.g. one or more processors, configured to perform the methods herein.

The second entity 12 may be represented by a prefetcher entity.

The second entity 12 may comprise a communication interface 1000 depicted in FIG. 10, configured to communicate e.g. with the first entity 10 and the third entity 14. The communication interface 1000 may comprise a transceiver, a receiver, a transmitter, and/or one or more antennas.

The second entity 12 may comprise an obtaining unit 1002, e.g. a receiver, transceiver or obtaining module. The second entity 12, the processing circuitry 1001, and/or the obtaining unit 1002 is configured to obtain one or more indications of one or more positions indicated by position data, wherein the position data is associated with data of the application being fragmented into a number of positions in a physical memory, wherein the position data indicates one or more positions of the number of positions in the physical memory. The position data may be obtained by being received from the first entity 10, or the third entity 14 involved in the final positioning of data. The position data may be one or more of the following: an index; an algorithm; a position value; and one or more intervals of positions of the physical memory. The obtained position data may be of the first type and/or the second type, wherein the first type may indicate that the physical memory allocated is disjoint and the second type may indicate that the physical memory allocated is contiguous. The one or more indications may be obtained dynamically during execution of a service.

The second entity 12 may further comprise a performing unit 1003, e.g. processing module. The second entity 12, the processing circuitry 1001, and/or the performing unit 1003 is configured to, upon execution of the application, perform prefetching of the data based on the obtained one or more indication of one or more positions.

The second entity 12 further comprises a memory 1004. The memory comprises one or more units to be used to store data on, such as indications, position data, and/or applications to perform the methods disclosed herein when being executed, and similar.

The methods according to the embodiments described herein for the second entity 12 may be implemented by means of e.g. a computer program product 1080 or a computer program, comprising instructions, i.e., software code portions, which, when executed on at least one processor, cause the at least one processor to carry out the actions described herein, as performed by the second entity 12. The computer program 1080 may be stored on a computer-readable storage medium 1090, e.g. a USB stick, disc or similar. The computer-readable storage medium 1090, having stored thereon the computer program product, may comprise the instructions which, when executed on at least one processor, cause the at least one processor to carry out the actions described herein, as performed by the second entity 12. In some embodiments, the computer-readable storage medium may be a non-transitory computer-readable storage medium.

Figure 11:
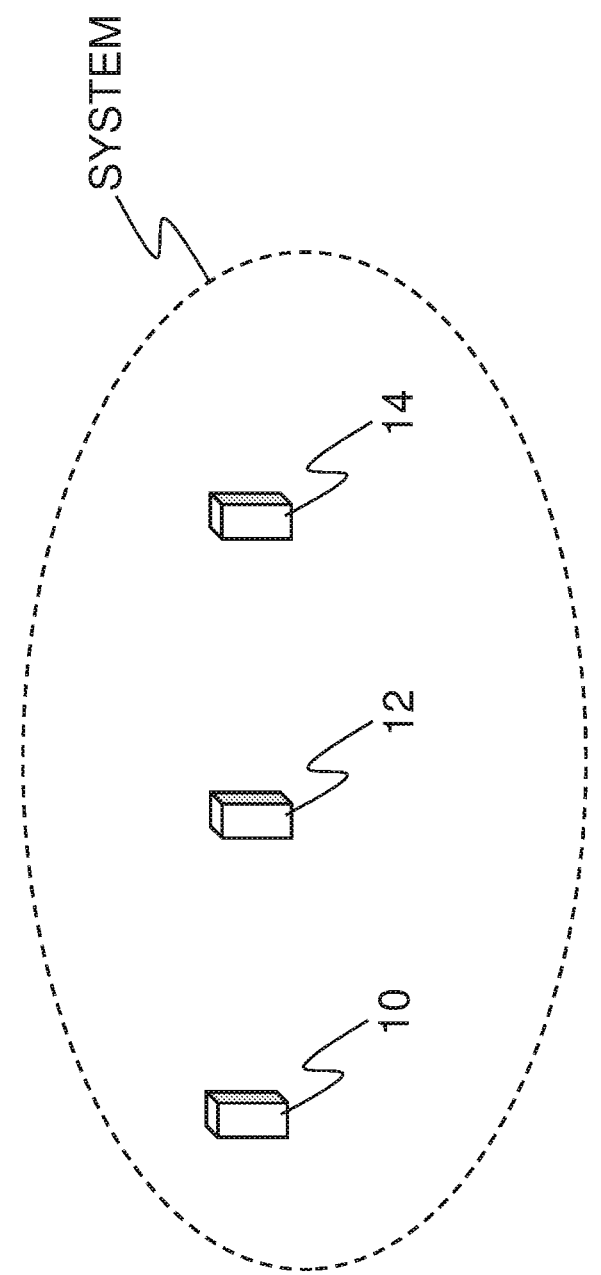
FIG. 11 is a block diagram depicting a system according to embodiments herein.

To perform the method actions above for handling memory operations of an application in a computer environment, the system may comprise a first entity 10, a second entity 12 and a memory entity configured to handle memory operations of an application in a computer environment, see FIG. 11. The first entity 10 is configured to obtain from the memory entity, position data associated with data of the application being fragmented into a number of positions in a physical memory. The position data indicates one or more positions of the number of positions in the physical memory. The first entity is further configured to provide to the second entity, one or more indications of the one or more positions indicated by the position data. Upon execution of the application, the second entity is configured to perform prefetching of the data based on the indicated one or more positions.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance trade-offs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a first entity for handling memory operations of an application in a computer environment, the method comprising:
   obtaining position data associated with data of the application being fragmented into a number of positions in a physical memory, wherein the position data indicates one or more positions of the number of positions in the physical memory;
   receiving a pre-fetching query requesting position data from a second entity; and
   in response to receiving the pre-fetching query, providing to the second entity one or more indications of the one or more positions indicated by the position data for prefetching data from the second entity using the one or more indications.

2. The method according to claim 1, wherein the position data is obtained by being retrieved from a third entity involved in a final positioning of data.

3. The method according to claim 1, wherein the position data is one or more of the following: an index; an algorithm; a position value; and one or more intervals of positions of the physical memory.

4. The method according to claim 1, further comprising:
obtaining the one or more indications based on the obtained position data.

5. The method according to claim 1, wherein the first entity is a standalone entity, or a collocated entity, wherein the first entity is at least partly collocated with a second entity being a prefetcher entity.

6. The method according to claim 1, wherein the one or more indications and/or the positioning data are obtained dynamically during execution of an application.

7. The method according to claim 1, wherein the obtained position data is of a first type and/or a second type, wherein the first type indicates that the physical memory allocated is disjoint and the second type indicates that the physical memory allocated is contiguous.

8. A first entity configured to handle memory operations of an application in a computer environment, wherein the first entity is further configured to:
obtain position data associated with data of the application being fragmented into a number of positions in a physical memory, wherein the position data indicates one or more positions of the number of positions in the physical memory;
receive a pre-fetching query requesting position data from a second entity; and
in response to receiving the pre-fetching query, provide, to the second entity, one or more indications of the one or more positions indicated by the position data for prefetching data from the second entity using the one or more indications.

9. The first entity according to claim 8, wherein the position data is obtained by being retrieved from a third entity involved in a final positioning of data.

10. The first entity according to claim 8, wherein the position data is one or more of the following: an index; an algorithm; a position value; and one or more intervals of positions of the physical memory.

11. The first entity according to claim 8, wherein the first entity is further configured to:
obtain the one or more indications based on the obtained position data.

12. The first entity according to claim 8, wherein the first entity is a standalone entity, or a collocated entity, wherein the first entity is at least partly collocated with a second entity being a prefetcher entity.

13. The first entity according to claim 8, wherein the one or more indications and/or the positioning data are obtained dynamically during execution of an application.

14. The first entity according to claim 8, wherein the obtained position data is of a first type and/or a second type, wherein the first type indicates that the physical memory allocated is disjoint and the second type indicates that the physical memory allocated is contiguous.

15. A second entity configured to handle memory operations of an application in a computer environment, wherein the second entity is further configured to:
provide, to a first entity, pre-fetching query requesting position data;
obtain one or more indications of one or more positions indicated by position data, wherein the position data is associated with data of the application being fragmented into a number of positions in a physical memory, wherein the position data indicates one or more positions of the number of positions in the physical memory; and upon execution of the application; and
perform prefetching of the data based on the obtained one or more indication of one or more positions.

16. The second entity according to claim 15, wherein the position data is obtained by being received from the first entity, or a third entity involved in a final positioning of data.

17. The second entity according to claim 15, wherein the position data is one or more of the following: an index; an algorithm; a position value; and one or more intervals of positions of the physical memory.

18. The second entity according to claim 15, wherein the second entity is a prefetcher entity.

19. The second entity according to claim 15, wherein the one or more indications are obtained dynamically during execution of a service.

20. The second entity according to claim 15, wherein the obtained position data is of a first type and/or a second type, wherein the first type indicates that the physical memory allocated is disjoint and the second type indicates that the physical memory allocated is contiguous.

21. A system comprising a first entity, a second entity and a memory entity configured to handle memory operations of an application in a computer environment, wherein the first entity is configured to obtain from the memory entity, position data associated with data of the application being fragmented into a number of positions in a physical memory, wherein the position data indicates one or more positions of the number of positions in the physical memory, receive a pre-fetching query requestion position data from the second entity, and in response to receiving the pre-fetching query the first entity is further configured to provide to the second entity, one or more indications of the one or more positions indicated by the position data; and the second entity is configured to upon execution of the application, perform prefetching of the data based on the indicated one or more positions.

* * * * *